May 28, 1963
H. J. WINKELSPECHT
3,091,274
TRACTION DEVICE
Filed Dec. 19, 1960
2 Sheets-Sheet 1
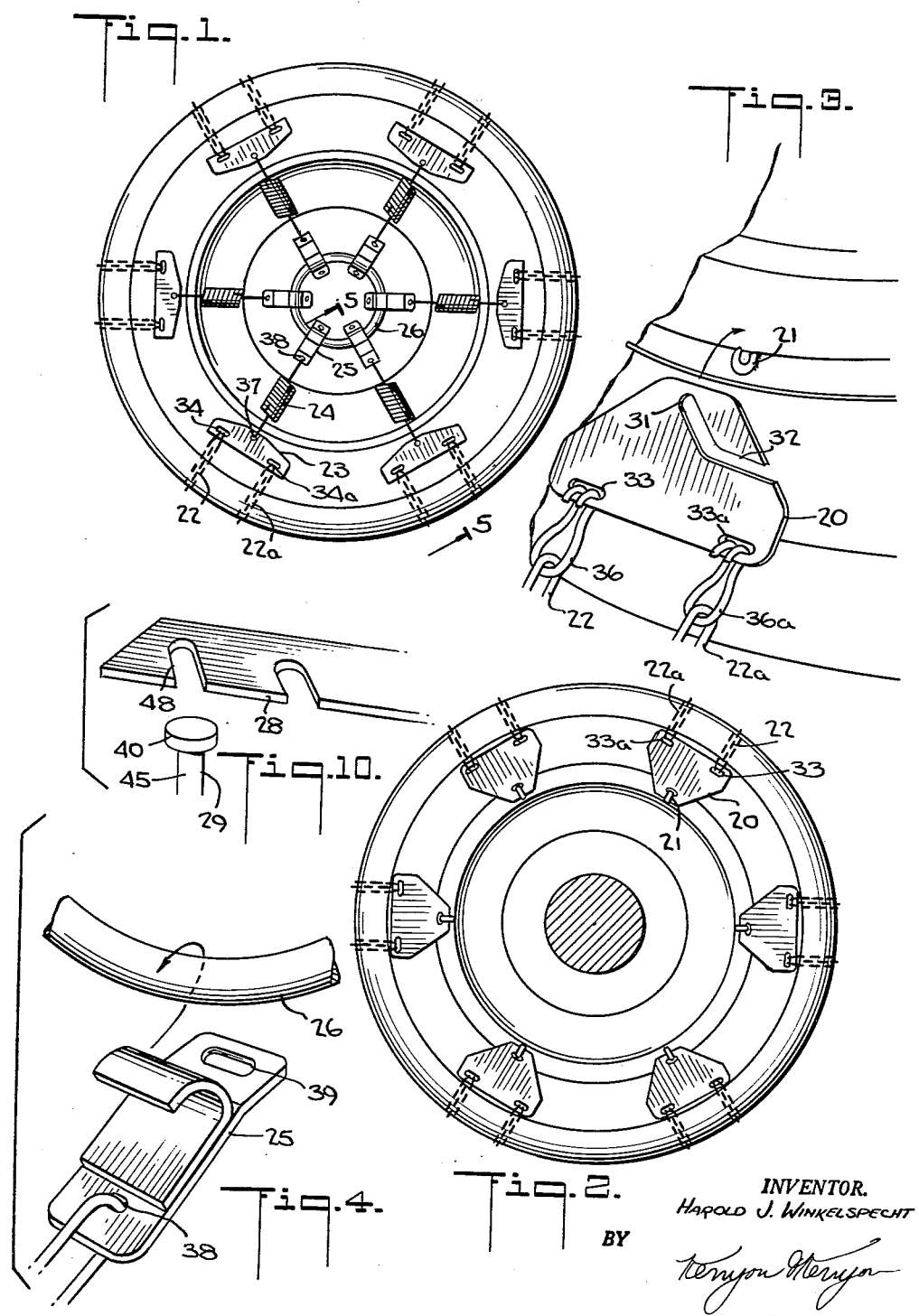
INVENTOR.
HAROLD J. WINKELSPECHT
BY
Kenyon Kenyon
ATTORNEYS

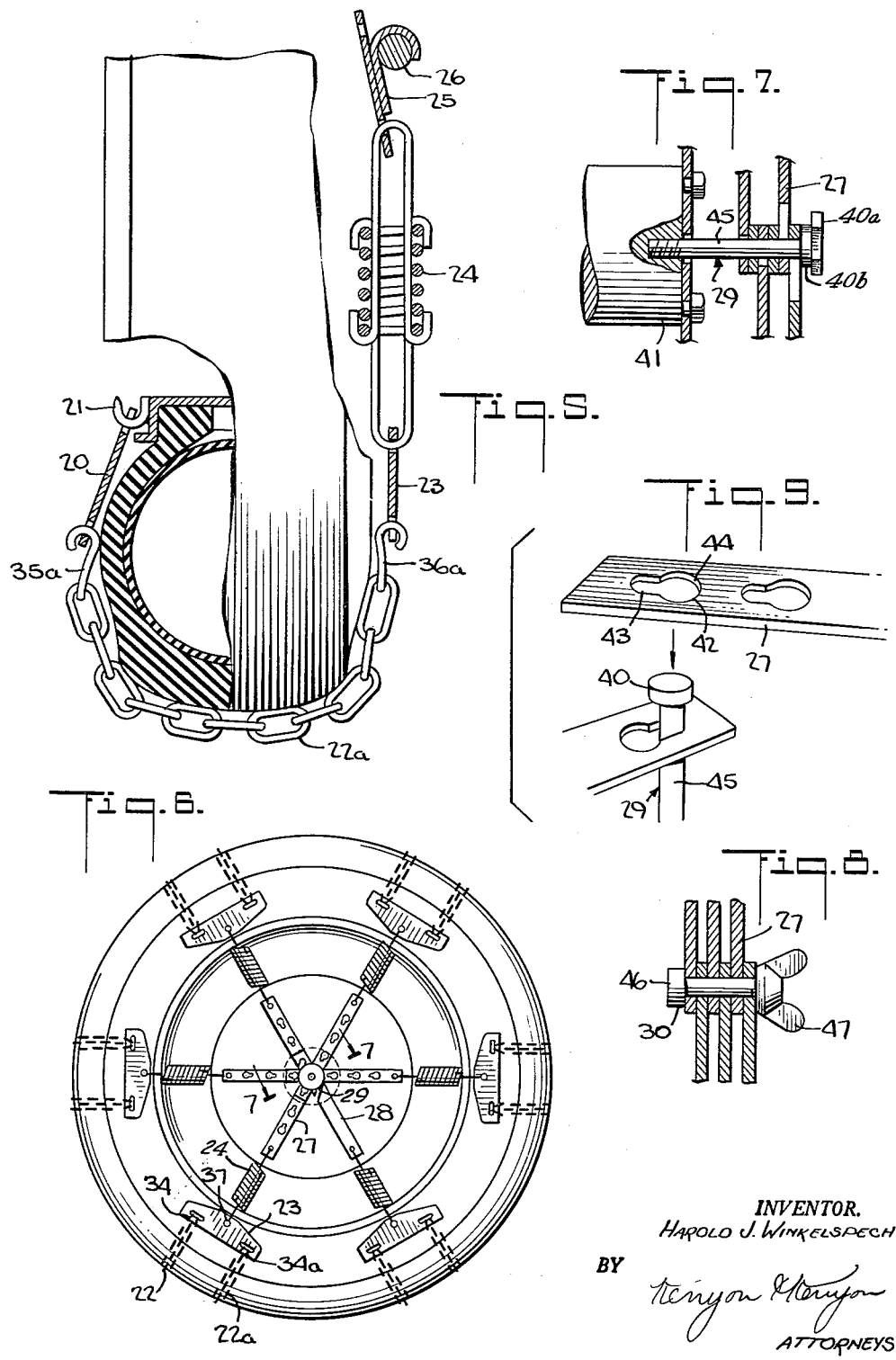

United States Patent Office 3,091,274
Patented May 28, 1963

3,091,274
TRACTION DEVICE
Harold J. Winkelspecht, Cooper and Warren Sts.,
Beverly, N.J.
Filed Dec. 19, 1960, Ser. No. 76,714
8 Claims. (Cl. 152—218)

This invention relates in general to traction devices, and more particularly to tire chains for motor vehicles.

Heretofore, there have been two types of tire chains, the type which wraps around the wheel and the unit type which comprises independent segments spaced around the wheel. Both types include good and bad features.

Almost everyone can imagine the difficulties in installing the type of chain which wraps around the wheel. Not so many are aware of the disadvantages of the present unit type chain. Many manufacturers will not handle unit type chains on the theory that since each independent segment remains in one spot, the tire will eventually be damaged in that spot. The type of chain which wraps around the wheel slips a little to spread the wear.

It is therefore, an object of this invention to provide a traction device which may be installed with a minimum of effort.

Another object of the invention is to provide a traction device which will cause a minimum of wear to the tire to which it is applied.

Another object of the invention is to provide a traction device which will automatically compensate for loosening caused by the wear of its parts.

Another object of the invention is to provide a traction device which will be efficient at high operating speeds.

Another object of the invention is to provide a traction device adjustable to a wider range of wheel and tire sizes.

Yet another object of the invention is to provide a traction device which will produce a minimum of vibration and noise when in operation on a wheel.

A still further object of the invention is to provide a traction device in which each segment is independently and automatically adjustable relative to tire pressure and tire flexure produced by bumps in the road.

Other objects and a further understanding of the invention may had by referring to the following description and claims, taken in conjunction with the accompanying drawings in which:

FIG. 1 shows a front plan view of a first embodiment of the invention in place upon a wheel.

FIG. 2 shows a rear plan view of the invention in place upon a wheel.

FIG. 3 shows a detail perspective view of the means of attachment of the invention to the rim of a wheel.

FIG. 4 shows a detail perspective view of the means of attachment of the first embodiment of the invention at the front of a wheel.

FIG. 5 shows a section taken in the direction 5—5 of FIG. 1.

FIG. 6 shows a front plan view of a second embodiment of the invention in place upon a wheel.

FIG. 7 shows a detail section taken in the direction 7—7 of FIG. 6.

FIG. 8 shows a detail section of an alternative means of attachment of the second embodiment of the invention at the front of a wheel taken in the direction 7—7 of FIG. 6.

FIG. 9 shows a detailed perspective view of the means of attachment of the second embodiment of the invention at the front of a wheel.

FIG. 10 shows a detail perspective view of a second alternative means of attachment of the second embodiment of the invention at the front of a wheel.

With reference to the drawings, the invention comprises, in general, plate 20 attached at the rear of a wheel by means of hook 21 as shown generally in FIG. 2 and as best shown in FIG. 3. Chains 22 and 22a, each connected to plates 20 and 23, are wrapped around the tire as best shown in FIG. 5, except that chain 22 is not shown. A self-limiting compression spring 24 is connected to plate 23 and hook 25, and hook 25 is attached to ring 26 as best shown in FIG. 4 in a first embodiment of the invention.

In a second embodiment of the invention, hook 25 is replaced by hooks 27 or 28 as shown generally in FIG. 6 and as best shown in FIGS. 9 or 10. Hooks 27 (or 28) is attached at the front of a wheel by rod 29 or bolt 30 as shown in FIG. 7 or 8 in the second embodiment of the invention.

In a first embodiment of the invention a hook 21 is welded to or attached by some other means, or integral with the rim of a wheel as best shown in FIG. 3. A plate 20 having a hole 31 therein is looped over the hook 21. In some automobiles, the protective plate over the brake drum might make it impossible to place the plate 20 over the hook 21. In that case, a slot 32 can be provided so that the plate 20 can be hooked in sideways.

Chains 22 and 22a, connected to plate 20 at slots 33 and 33a respectively, are wrapped around the tire as shown in FIGS. 3 and 5. Plate 23 is connected to chains 22 and 22a at slots 34 and 34a respectively as shown in FIG. 1.

Hooks 35, 35a, 36 and 36a have their prongs turned outward to prevent damage to the tire. A self-limiting compression spring 24 is connected to plate 23 at hole 37 and hook 25 at hole 38.

Hook 25 is connected to ring 26 as best shown in FIG. 4. A tension spring, not shown, may be hooked to the ring 26 diametrically opposite to hook 25 and extend to the rim on the opposite side of the wheel to hold the first segment in place until a second segment can be applied. In position, an even number of segments is advised to provide balance and to better center the ring 26, which is suspended by the combined pull of all the compression springs 24.

The compresison spring 24 may be compressed by a simple spring compressing device, not shown, or a screwdriver or crowbar may be inserted in slot 39 of hook 25. Various graduated sizes of ring 26 may be used to compensate for various tire and wheel sizes. The rim of the wheel or the ring 26 may be used as a fulcrum to facilitate attachment and removal of each segment. A single chain with rings at each end may replace chains 22 and 22a and plates 20 and 23.

In a second embodiment of the invention, hook 25 is replaced by either hook 27 or hook 28 as shown generally in FIG. 6 and as best shown in FIG. 9 or FIG. 10. A rod 29 having a head 40 is integral with the axle 41 of the car as shown in FIG. 6 or may be screwed into the axle 41 as shown in FIG. 7 at 41a or into a nut, not shown, welded to the axle 41. Hook 27 has a series of slots 42 having a small end 43 and a larger end 44 as best shown in FIG. 9. The larger end 44 clears the head 40 of the rod 29 and then the smaller end 43 encompasses the shanks 45 of the rod 29. The self-limiting compression spring 24 provides tension to keep the small end 43 of the slot 42 bearing against the shank 45 so that the hook 27 cannot come off the rod 29. A series of slots 42 is provided to render the invention adjustable to different tire and wheel sizes.

Instead of the rod 29, a bolt 30 having a head 46 comparable to head 40 of rod 29 may be used with a wing nut 42 at the other end as shown in FIG. 8. Also a threaded rod, may be used with a nut 49a and lock washer 40b at either end as shown in FIG. 7.

Instead of hook 27, hook 28 may be used as best shown in FIG. 10. Hook 28 has a series of slots 48 with sufficient width to encompass shank portion 45 of rod 29. The slots 48 taper back at an angle, for example 45°, to prevent them from sliding off of rod 29. A series of slots 48 is provided to render the invention adjustable to a wide range of tire and wheel sizes.

A simple spring compression device, not shown, may be used as in the first embodiment to facilitate attachment and removal of the segments. Again, an even number of segments should be employed to reduce the strain on rod 29.

In operation, the self-limiting compression spring 24 automatically compensates for differences in the pressure and the flexure caused by bumps in the road. Thus the tire chain always remains tight, and wear to the tire is sharply reduced. Also the loosening effect of wear to the part of the tire chain is automatically compensated for. The self-limiting feature of the compression spring 24 sets a limit to which the tire chain can expand. Thus each segment is kept well under control. A motor vehicle using this type chain has been driven at speeds up to sixty miles per hour with the vehicle well under control, which is impossible with present-type chains.

Thus a simple traction device has been devised which may be applied to a wheel with a minimum of effort. The advantages of this type traction device over the wrap-around type may be seen in its application to a wheel stuck in a ditch. Each segment may be applied without movement of the vehicle. The tightness of each segment obviates the disadvantages of wear in previous unit type chains.

Although this invention has been described in its preferred form with a certain degree of particularity, it is understood that the present disclosure of the proposed form has been made only by way of example and numerous changes in the details of construction and the combination and arrangement of parts may be resorted to without departing from the spirit and the scope of the invention.

What is claimed is:

1. A traction device for a wheel, including a rim and a tire casing, journaled by an axle comprising: at least one lug secured to one side of said rim; an elongated chain extendable across said casing; means for removably securing one end of said chain to said lug; a self-limiting compression spring one end of which is secured to the other end of said chain; anchoring means axially mounted to end of said axle and adapted to removably secure the other end of said spring in position.

2. A traction device for a wheel, including a rim and a tire casing, journaled by an axle comprising: at least one lug secured to one side of said rim; an anchoring pin mounted on one end of said axle and adapted to centrally extend through and to the exterior of said wheel; a pair of elongated chains extendable across said casing; means for removably securing one end of said chains to said lug; a self-limiting compression spring one end of which is secured to the other end of said chains; means for removably securing the other end of said spring to said pin.

3. The traction device of claim 2 wherein said pin has an enlarged free end and a strip is attached to said spring, said strip having at least one keyhole opening adapted to receive and retain said anchoring pin by said enlarged end.

4. The traction device of claim 2 wherein the means for securing said spring to said pin is attached to said spring and provided with at least one open slot adapted to receive said anchoring pin and means for removably retaining said pin in said slot.

5. A traction device for a wheel, including a rim and a tire casing, journaled by an axle comprising: at least one lug secured to one side of said rim; an anchoring pin removably and axially mounted on one end of said axle, said pin having a threaded free end, and being adapted to centrally extend through and to the exterior of said wheel; a pair of elongated chains extendable across said casing, means for removably securing one end of said chains to said lug; a self-limiting compression spring one end of which is secured to the other end of said chains; a strip attached to said spring provided with at least one hole of larger diameter than the diameter of said anchoring pin, and a nut adapted to be threaded upon said free end of said pin after it has passed through said opening in said strip.

6. A traction device for a wheel, including a rim and a tire casing, journaled by an axle comprising: a plurality of lugs substantially equidistant from one another secured to one side of said rim; a plurality of pairs of elongated chains extendable across said casing; means for removably securing one end of each of said pairs of chains to one of said lugs; a self-limiting compression spring secured to the other end of each of said pairs of chains; anchoring means axially mounted on one end of said axle and adapted to centrally extend through and to the exterior of said wheel; means for removably securing said springs together by one end of each of said springs to said anchoring means.

7. A traction device for a wheel, including a rim and a tire casing, journaled by an axle comprising: a plurality of lugs substantially equidistant from one another secured to one side of said rim; a plurality of pairs of elongated chains extendable across said casing; a plate connector permanently attached to one end of each of said pairs of chains, and being provided with an opening adapted to receive one of said lugs for removably securing said chain to the lug; a self-limiting compression spring secured to the other end of each of said pairs of chains; anchoring means axially mounted on one end of said axle and adapted to centrally extend through and to the exterior of said wheel; means for removably securing said springs together by one end of each of said springs to said anchoring means.

8. A traction device for a wheel, including a rim and a tire casing journaled by an axle comprising: at least one lug secured to one side of said rim; at least one elongated chain extendable across said casing; means for removably securing one end of said chain to said lug; a self-limiting compression spring, one end of which is secured to the other end of said chain; anchoring means removably and axially mounted into one end of said axle and means for removably securing the other end of said spring to said anchoring means.

References Cited in the file of this patent

UNITED STATES PATENTS

| 1,338,087 | Klemm | Apr. 27, 1920 |
| 2,460,023 | McGuiness | Jan. 25, 1949 |
| 2,750,981 | Hoffman | June 19, 1956 |
| 2,898,966 | Machesney | Aug. 11, 1959 |
| 2,904,094 | Raber | Sept. 15, 1959 |
| 2,970,632 | Kuc | Feb. 7, 1961 |